United States Patent [19]

Engle

[11] Patent Number: 5,521,746
[45] Date of Patent: May 28, 1996

[54] POPPET VALVE MODULATOR

[76] Inventor: Craig D. Engle, 336 Cline Ave., Griffith, Ind. 46319

[21] Appl. No.: 20,692

[22] Filed: Feb. 22, 1993

[51] Int. Cl.$^6$ .................................................. G02B 26/00
[52] U.S. Cl. ........................... 359/292; 359/259; 359/263
[58] Field of Search ....................................... 359/290, 291, 359/292, 259, 263

[56] References Cited

U.S. PATENT DOCUMENTS

| | | | |
|---|---|---|---|
| 3,137,762 | 6/1964 | Baumgartner et al. | 88/61 |
| 3,480,348 | 11/1969 | Preston, Jr. | 359/291 |
| 3,626,084 | 12/1971 | Whol | 178/7.5 D |
| 3,654,606 | 4/1972 | Marlowe et al. | 340/166 |
| 3,835,346 | 9/1974 | Mast et al. | 313/394 |
| 3,879,630 | 4/1975 | Halperin et al. | 313/394 |
| 3,905,683 | 9/1975 | Roach et al. | 350/161 |
| 4,013,345 | 3/1977 | Roach | 350/161 S |
| 4,233,603 | 11/1980 | Castleberry | 340/783 |
| 4,494,826 | 1/1985 | Smith | 350/360 |
| 4,626,920 | 12/1986 | Glenn | 358/234 |
| 4,694,287 | 9/1987 | Chenevas-Paule et al. | 340/719 |
| 4,779,963 | 10/1988 | Rhomberg | 350/361 |
| 4,825,202 | 4/1989 | Dijon et al. | 340/752 |
| 4,879,602 | 11/1989 | Glenn | 358/233 |
| 4,900,136 | 2/1990 | Goldburt et al. | 350/360 |
| 5,157,538 | 10/1992 | Soref | 359/259 |
| 5,319,491 | 6/1994 | Selbrede | 359/291 |

OTHER PUBLICATIONS

Ediphor System of Theater Television, Earl I. Sponable, Journal of SMPTE vol. 60, Apr. 1953.
Technical Report RADC-TR-71, Dielectric Membrane Light Valve Study by Eugene T. Kozol et al, Mar. 1971, Section 5.2.2.
Analysis of Fluid Light Valve Control Layers for High Definition Television Picture Projection by R. Tepe, Journal of Applied Physics 57 (7) 1, Apr. 1985.
Deformable Surface Spatial Light Modulator by K. Hess et al, Optical Engineering/May 1987, vol. 26. No. 5.
Viscoelastic Spatial Light Modulators and Schlieren Optical Systems for HDTV Projection Displays by R. Gerhard-Multhaupt er al, SPIE vol. 1255 Large Screen Projection Displays 11 (1990).
Viscoelastic Spatial Light Modulator with Active Matrix Addressing by R. Tepe et al, Applied Optics vol. 28, No. 22 15 Nov. 1989.
Theoretical Analysis of an Electrically Addressed Viscoelastic Spatial Light Modulator by R. Tepe, vol. 4, No. 7 Jul. 1987. J. Opt. Soc. Am.
Deformation Behavior of Thin Viscoelastic Layers Used in an Active-Matrix-Addressed Spatial Light Modulator by W. Brinker er al, SPIE vol. 1018.
The Ruticon Family of Erasable Image Recording Devices by N. Sheridon, IEEE Transactions on Electron Devices, Sep. 1972.
The Ruticon as a Projection Display Device by N. K. Sheridon.
Spatial Light Modulators by David Casasent, Proceedings of the IEEE vol. 65, No. 1, 1977.
An Infrared Video Image Projector by M. L. Noble, TIS No. R83ELS010, Apr. 1983.
Deformographic Storage Display (DSD) Final Report IBM No. 75-A59-002 Contract No. 11632(590601) 75R 13 Jun. 1975, approved by P. F. Olsen.
The Future of Thin-Film Active Devices by Charles Feldman Electronics, Jan. 24,1964.
A Membrane Page Composer by L. S. Cosentino and W. C. Stewart, RCA Review vol. 34, Mar. 1973.
Patent Application "Enhanced Surface Light Modulator" Ser. No. 07/953,118 filed by Craig D. Engle Sep. 29, 1992.
Patent Application "Enhanced Electrostatic Shutter Mosaic Modulator" Ser. No. 07/955,058, by Craig D. Engle.
Patent Application "Enhanced Membrane Light Modulator" Ser. No. 07/958,642, by Craig D. Engle.

*Primary Examiner*—Georgia Y. Epps
*Assistant Examiner*—Thomas Robbins

[57] ABSTRACT

A surface deformation type spatial light modulator is electronically addressed by an active matrix array affixed to a second surface of an insulating substrate. Optically reflective electrodes are affixed to the substrate. Each electrode is electrically connected to a respective electronic addressing element by a feedthrough. Overlapping each electrode is a transmissive deformable media layer. Affixed to a first media layer face of the media layer is a transmissive conductor. A potential control is provided to control the potential difference between each electrode and the conductor in accordance with an information bearing signal. A wavefront to be modulated traverses the media, impinges on the electrodes, traverses the media layer a second time before exiting the modulator. Several advantages exist in the invention including increasing the modulation sensitivity of electronic addressed surface deformation type spatial light modulators.

19 Claims, 4 Drawing Sheets

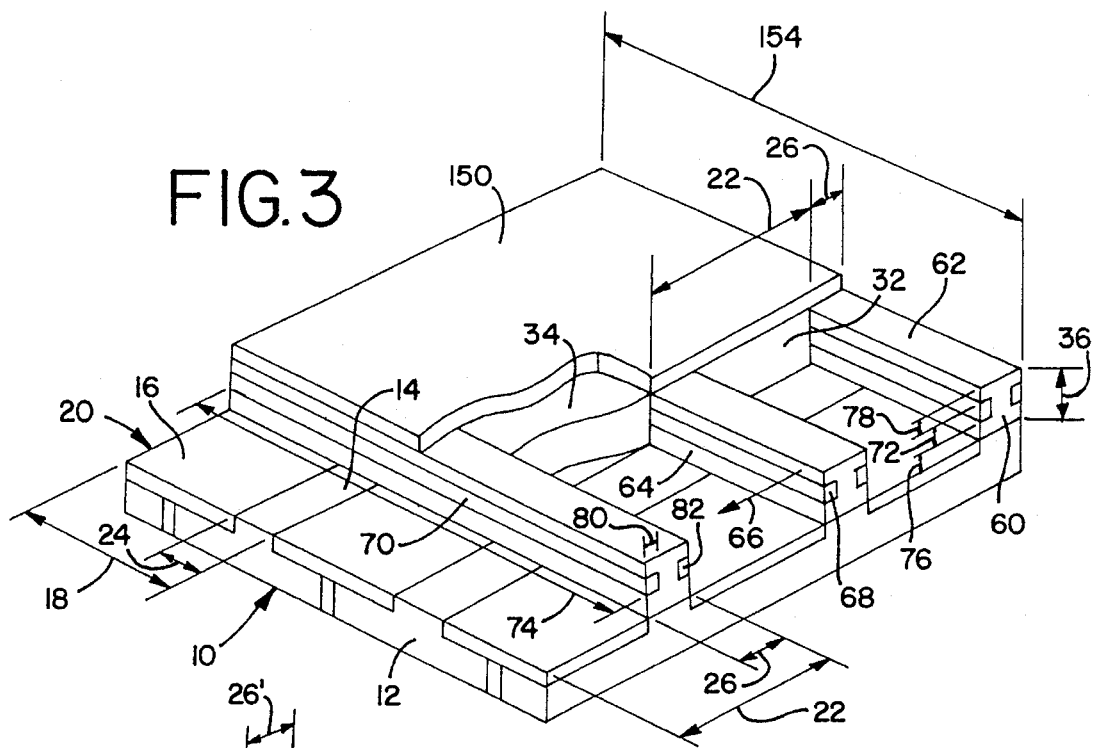
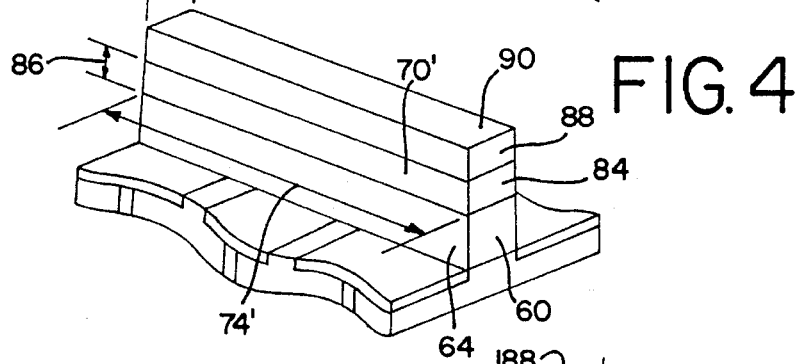
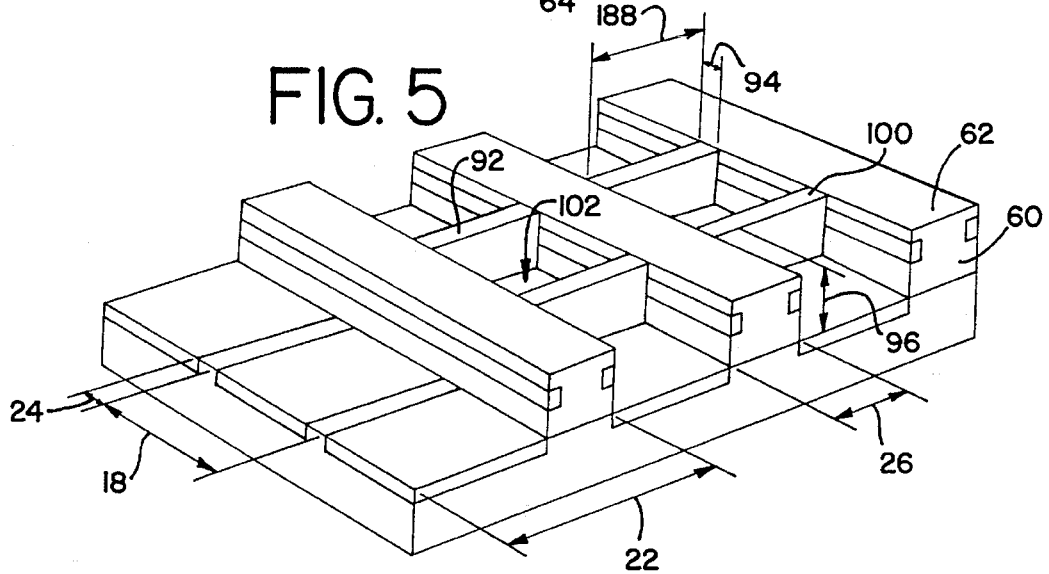

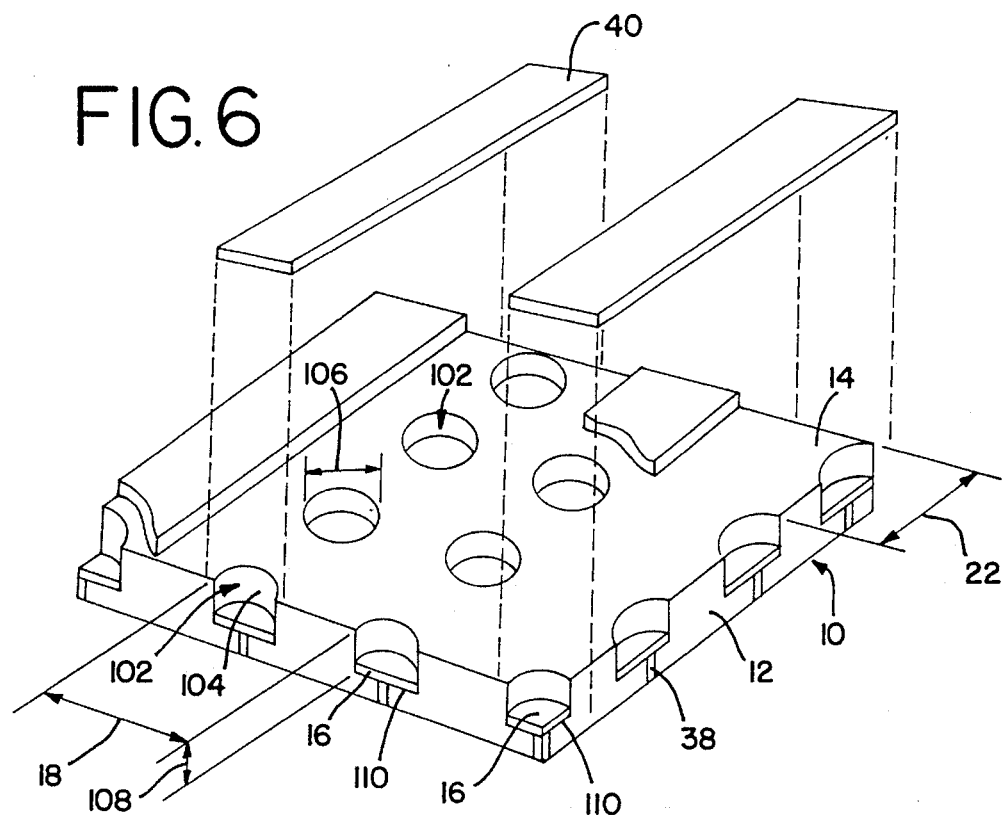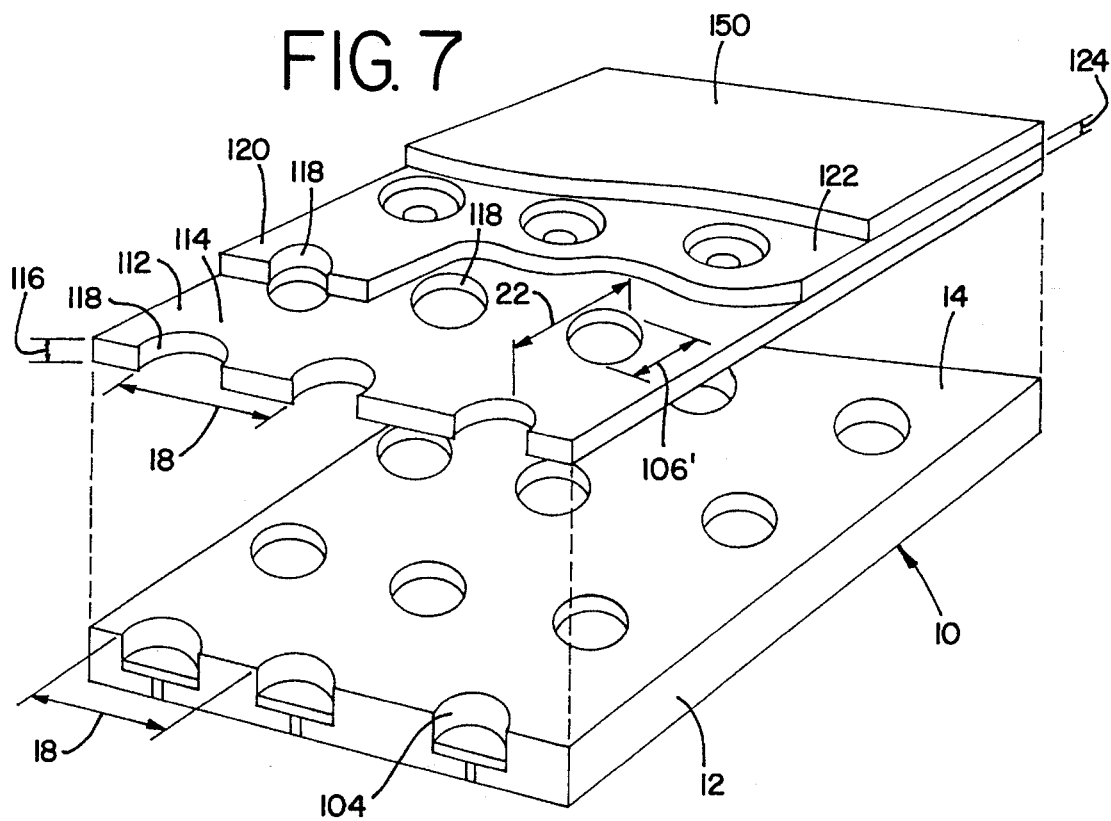

POPPET VALVE MODULATOR

BACKGROUND—FIELD OF INVENTION

This invention relates to electronically addressed surface deformation type spatial light modulators and how to enhance reliability and efficiency of electronically addressed surface deformation type spatial light modulators.

BACKGROUND—PRIOR ART

Surface deformation type spatial light modulators have been addressed by a variety of techniques. Included are electron beam addressed devices. Surface deformation media which have been electron beam addressed include oil films and elastomers. Examples are U.S. Pat. No. 3,626,084 to Whol, Dec. 7, 1971, and the configuration described in the article "Ediophor System of Theater Television" by Earl I. Sponable, Journal of the SMPTE Vol. 60, April, 1953.

In U.S. Pat. No. 3,626,084, a transmissive conductive reference plane is affixed to the faceplate of the device. A separation gap exists between this reference plane and the deformable media.

Transmissive and reflective targets where identified in U.S. Pat. No. 3,626,084, A reflective target is identified in FIG. 5. In FIG. 5, a wavefront to be modulated would traverse the deformable media, impinge on the reflector, reverses direction of propagation, traverse the deformable media a second time, then exit the media. Note that the reference plane is not affixed to the deformable media in this figure.

The device described in U.S. Pat. No. 3,626,084 underwent several modifications. U.S. Pat. No. 3,879,630 to Halperin et al, Apr. 22, 1975, describes a target assembly which is compatible with the device of U.S. Pat. No. 3,626,084. An optically reflective conductor is affixed to the first surface of the deformable media in this target assembly. Affixing a reflective first surface conductor to the deformable media eliminates gaps which hindered efficiency in previous configurations. However, it must be noted that utilizing a reflective first surface conductor in any deformable device precludes a wavefront from traversing the deformable media.

Additional system considerations which involved the device of U.S. Pat. No. 3,626,084 are described in Technical Report, RADC-TR-71, titled "Dielectric Membrane Light Value Study" by Eugene T. Kozol et al, March, 1971. In section 5.2.2, titled "Reflective versus Transmissive Systems", a sensitivity analysis is provided involving transmissive versus reflective surface deformation type targets. The only reflective system phase modulation relationship considered is equation 5-5. Equation 5-5 is for a reflective first surface target; presumably, the reflective target analyzed is similar to U.S. Pat. No. 3,879,630. No index of refraction is present in equation 5-5, indicating that no consideration was given to a reflective modulator configuration which employed a transmissive reference plane affixed to the first surface, thereby avoiding gaps as in previous art, and utilizing a second surface reflector. This would allow a wavefront to traverse the deformable media. As to be shown herein, such a configuration increases the sensitivity of a surface deformation type spatial light modulator over reflective configurations which employ a reflective first surface.

The Edphoir system utilized a target configuration which permits a wavefront to traverse a deformable media prior to impinging on a reflective surface. However, this configuration suffers from being electron beam addressed. Electron beam addressing suffers from extremely high voltages, packaging complications and a vacuum environment. References include U.S. Pat. No. 3,835,346 to Mast et al, Sep. 10, 1974 and "Analysis of Fluid Light Value Control Layers for High Definition Television Picture Projection" by R. Tepe, Journal of Applied Physics 57 (7) 1 Apr. 1985.

Other surface deformation type spatial light modulators include the device described in the article "Deformable Surface Spatial Light Modulator" by K. Hess et al, Optical Engineering/May, 1987, Vol. 26. No. 5. This device utilizes a photoconductor interface which requires extraneous components when utilized in applications involving electronic to optical data conversions, such as display (HDTV) applications. Due to extraneous components, which degrades signal fidelity, image converters and amplifiers are deemed undesirable in such applications.

In addition, the device described in the article "Deformable Surface Spatial Light Modulator" utilizes an internal reflection mechanism in the modulator configuration. This requires the incident wavefront rays to enter the modulator at or above a critical angle which is dependant upon the index of refraction of the deformable media. This increases the bulk of the device and is undesirable for applications involving home projection display systems. Due to several complicating factors, this device is deemed undesirable.

A surface deformation device which utilizes electronic addressing elements is described in the article "Viscoelastic Spatial Light Modulators and Schlieren Optical Systems for HDTV Projection Displays" by R. Gerhard-Multhaupt et al, SPIE Vol. 1255 Large Screen Projection Displays 11 (1990). FIG. 1 shows a reflective first surface configuration. This precludes a wavefront to be modulated from traversing the modulation media. As to be shown herein, this configuration suffers from a reduced modulation efficiency. In addition, as quoted in the references provided herein, first surface reflectors typically have a less than optimum reflectance value. This is attributed to compromises which are made so the reflective electrode thickness will not adversely effect surface deformation profiles. As to be shown herein, my invention avoids this complication.

Additional configuration information for the viscoelastic Spatial Light Modulator is presented in the articles "Viscoelastic Spatial Light Modulators with Active Matrix Addressing" by R. Tepe et al, Applied Optics Vol. 28, NO. 22 15 Nov. 1989, "Theoretical Analysis of an Electrically Addressed Viscoelastic Spatial Light Modulator" by R. Tepe, Vol. 4, No. 7 July, 1987, J. Opt. Soc. Am. A., "Deformation Behavior of Thin Viscoelastic Layers Used in an Active-Matrix-Addressed Spatial Light Modulator" by W. Brinker et al, SPIE Vol. 1018. Active matrix configurations are described in the cited references which utilize more than one active addressing element per pixel site. The second transistor at each pixel site shown in FIG. 3 of the latter reference is not a redundant matrix component. Accordingly, as well understood by those knowledgeable in the state of the art, increasing the number of active components in an addressing element matrix adversely effects reliability. As to be shown herein, alternative techniques are utilized in my invention which reduce the number of electronic addressing elements which enhances reliability compared to prior art.

Several other prior art examples also share some of the complications identified with the viscoelastic spatial light modulator. Examples include U.S. Pat. No. 4,626,920 to Glenn, Dec. 2, 1986. The reflective surface utilized in this invention precludes a wavefront from traversing the deformation media, adversely effecting modulation efficiency. In addition, the substrate utilized in this invention is a semiconductor substrate. Semiconductor substrates require extraneous isolation components when compared to insulating substrates. Isolation components refer to electrical and/or optical isolation components. As to be shown herein, insulating substrates offer a great deal of flexibility in dealing with fringing fields.

Semiconductor substrate circuit processing often involves "single face processing". This limits configurations and processing options available to merge circuits and the deformable media. Advantages of "dual face processing" versus "single face processing" are provided in the references cited herein. As to be shown herein, my invention utilizes both faces of a circuit substrate. This expands processing options, enhances electrical and/or optical isolation features, and increases configuration options available for the active matrix. In addition, as to be shown herein, these benefits are compatible with bias electrodes.

As identified in U.S. Pat. No. 4,879,602 to Glenn, Nov. 7, 1989, intrusion of light from the imaging system onto the semiconductor elements of the active matrix array is a concern. As to be shown herein, dual face processing of spatial light modulator substrates, an option available in my invention, increases the functionality of the substrate by allowing the substrate to prevent intrusion of the incident light onto the electronic addressing elements. The dual face processing feature of my invention allows components (the substrate in this instance, other component examples exist) to increase their functionality, avoiding extraneous components. In addition, the optically reflective electrodes of my invention are affixed to the substrate. This enhances deformation efficiency by allowing the wavefront to traverse the deformation media. In addition, electrodes affixed to a substrate provide a higher reflectance value than reflectors affixed to the first surface of the deformable media, since "thicker" electrodes are affixed to the substrate, and not adversely effect the desired deformation profile, as in prior art. This aids in elimination of extraneous light and increases the luminous efficiency of my invention as compared to prior art. As to be shown herein, synergism is present in my invention.

U.S. Pat. No. 4,779,963 to Rhomberg Oct. 25, 1988, is an optical image amplifier. Additional image amplifiers and/or wavelength converters, include U.S. Pat. No. 3,905,683 to Roach et al, Sep. 16, 1975, U.S. Pat. No. 3,137,762 to W. Baumgartner et al, Jun. 16, 1964, U.S. Pat. No. 4,494,826 to Smith, Jan. 22, 1985, and U.S. Pat. No. 4,013,345 to Roach Mar. 22, 1977. As previously identified, image amplifiers require extraneous components rendering them undesirable for electronic to optical data conversion applications, such as HDTV devices for home use.

Surface deformation devices which utilized a first surface reflector, precluding a wavefront from traversing the deformation media and therefore reducing modulation efficiency, include U.S. Pat. No. 4,900,136 to Goldburt et al, Feb. 13, 1990.

Additional surface deformation type spatial light modulators are identified in the articles "The Ruticon Family of Erasable Image Recording Devices" by N. Sheridon, IEEE Transactions on Electron Devices, September, 1972, "The Ruticon as a Projection Display Device" by N. K. Sheridon, and "Spatial Light Modulators" by David Casasent, Proceedings of the IEEE Vol. 65, No. 1, January, 1977. These devices suffer from non-solid state addressing configurations and/or reflective configurations which preclude the wavefront from traversing the media, thus reducing efficiency.

OBJECTS AND ADVANTAGES

Accordingly, several objects and advantages of my invention are,

1) To introduce new electrode configurations for use with electronic addressed surface deformation type spatial light modulators.

2) To demonstrate how the electrode structures of my invention enhances modulator efficiency of electronic addressed surface deformation type spatial light modulators.

3) To show how the electrode structures of my invention enhances other aspects of electronic addressed surface deformation type spatial light modulators, such as spatial resolution, reliability, and component functionality.

4) To identify the utility of insulating substrates in my invention, and how my invention increases the functionality of such substrates in surface deformation type spatial light modulators.

5) To identify several deformable media materials which are utilizable in my invention.

6) To identify several electronic addressing elements and active matrix array configurations which are utilizable with my invention.

7) to show how the electronic addressing components and matrix configurations of my invention enhances reliability and efficiency of surface deformation type spatial light modulators.

8) To show how my invention employs bias electrodes and avoid electrical crossover networks to provide an enhanced electronically addressed surface deformation type spatial light modulator.

9) To identify advantages of utilizing dual face processing of my invention.

Further objects and advantages of my invention will become apparent from a consideration of the drawings and ensuing description of it.

LIST OF FIGURES

FIG. 3 shows how ridges are utilized to establish boundary constraints in the deformable media of my invention.

FIG. 4 shows an alternative method of implementing bias electrodes.

FIG. 5 shows an alternative techniques for establishing boundary constraints in the deformable media.

FIG. 6 shows still another technique for establishing boundary constraints in deformable media.

FIG. 7 Shows how bias electrodes are implemented with boundary constraints.

DESCRIPTION OF INVENTION

Figure 1:
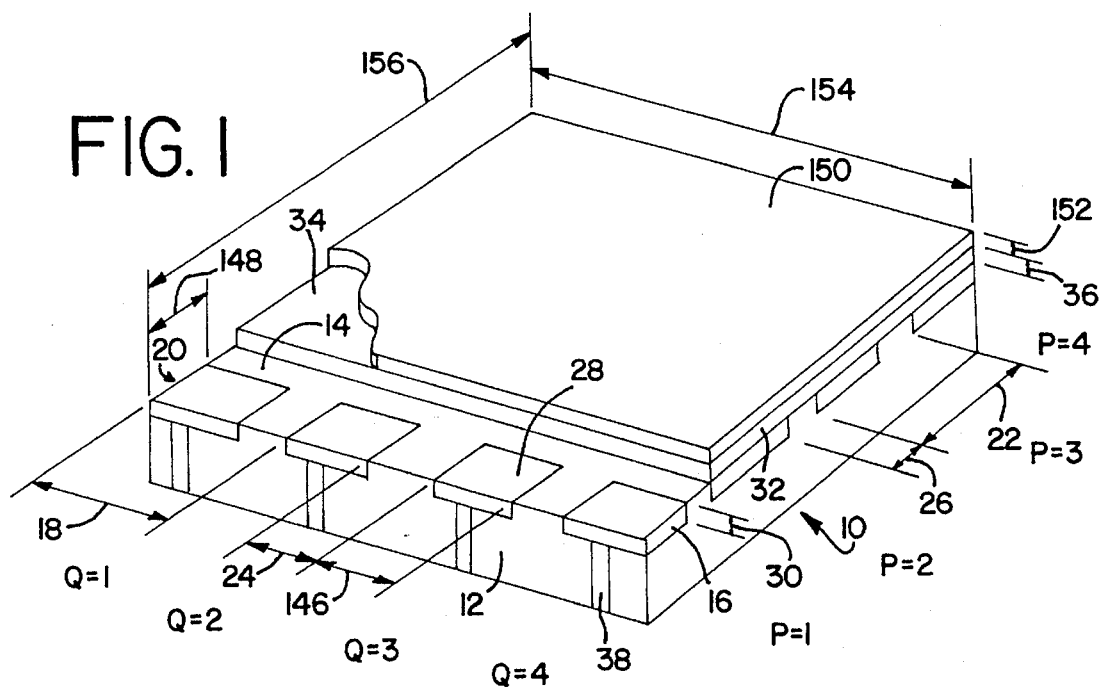
FIG. 1 shows a surface deformation type spatial light modulator utilizing a transmissive first surface conductor.

FIG. 1 shows an enhanced electronic addressed surface deformation type spatial light modulator 10. Modulator 10 contains a insulating substrate 12. Substrate 12 contains a first major surface 14. A plurality of optically reflective electrodes 16 are arranged in a matrix of p rows and q columns. Adjacent electrodes 16 in each row p are displaced by a first period 18. Each row p of electrodes 16 forms a linear electrode array 20. Adjacent linear electrode arrays 20 are displaced by a second period 22. Period 22 is perpendicular to period 18. Adjacent electrodes 16 in each row p are separated by a insulating width 24. Adjacent electrodes 16 in each column q are separated by an insulating length 26. Each electrode 16 has a first active dimension 146. Active dimension 146 is parallel to period 18. Active dimension 146 is equal to period 18 minus width 24. Each electrode 16 has a second active dimension 148. Second active dimension 148 is parallel to period 22. Second active dimension 148 is equal to period 22 minus length 26.

Every electrode 16 has an incident surface 28. Every electrode 16 is embedded in substrate 12. Embedding electrodes 16 in substrate 12 requires incident surface 28 to be coplanar with surface 14. Each electrode 16 has an electrode depth 30. Electrode depth 30 is perpendicular to period 18 and period 22. Embedding electrodes 16 in substrate 12 required depth 30 to be recessed below surface 14. Electrodes are capable of being embedded in an insulating substrate by a variety of techniques. Wells are etched into the substrate and a metal, such as Aluminum, vacuum deposited into the well to embed optically reflective electrodes in the substrate. Embedding electrodes in the substrate represents a means to affix optically reflective electrodes to a substrate. Alternative means to affix optically reflective electrodes to a substrate include vacuum deposition of reflective electrodes upon the first surface of the substrate.

Utilizing an electrically insulating substrate allows the substrate to provide electrical isolation between adjacent electrodes. This increases the functionality of the substrate in my invention. Substrate materials will be identified herein.

Disposed over every electrode 16 is a transmissive deformable media layer 32. Transmissive is a term relative to the wavelengths of the wavefront to be modulated; restriction to visible wavelengths should not be assumed. A portion of layer 32 has been removed to reveal features of my invention. Layer 32 further includes a first media layer face 34. When layer 32 is in an undeformed state, face 34 is essentially a planar surface, essentially parallel to surface 14. Layer 32 contains a second media layer face. The second media layer face is not visible in this figure. When layer 32 is in an undeformed state, the second face is essentially parallel to first face 34. In an undeformed state, first face 34 is separated from the second face by a media thickness 36. Thickness 36 is perpendicular to period 18 and period 22. In an undeformed state, thickness 36 is perpendicular to face 34.

Layer 32 is affixed to substrate 12 by a media affixing means. Media affixing means depends on the deformation media. Media affixing means which have been utilized with a variety of media are included in the references cited herein.

Media affixing means further includes affixing the second media layer face to surface 14 of substrate 12. Media affixing means further includes the second media layer face adhering to every electrode 16.

A transmissive flexible conductor 150 is affixed to substrate 12 by a conductor affixing means. Conductor affixing means includes affixing conductor 150 to the first media layer face 34. Since layer 32 is affixed to first surface 14 of substrate 12, conductor 150 is affixed to first surface 14 of substrate 12 by a means. Transmissive conductor materials and techniques for depositing such electrodes on a deformable media are well understood by those knowledgeable in the state of the art. Examples are identified in the references provided herein.

Conductor 150 is shown as a monolithic conductor, but as to be shown herein, alternative configurations are feasible. When media layer 32 is in an undeformed state, conductor 150 has a conductor thickness 152. Conductor thickness 152 is parallel to media thickness 36. Conductor 150 spans a first modulator dimension 154. Dimension 154 is parallel to period 18. Conductor 150 spans a second modulator dimension 156. Dimension 156 is parallel to period 22.

Substrate 12 further includes a plurality of feedthroughs 38. Feedthroughs 38 are utilized to electrically connect each electrode 16 to a respective electronic addressing element. (Electronic addressing elements and the second surface are not shown in this figure for clarity). Feedthroughs 38 are a means to electrically connect each electrode 16 to a respective addressing element.

A potential control means is provided to control the potential difference between each electrode 16 and conductor 150 to establish an electric field in layer 32. The potential control means is not shown. The electric field associated with each electrode 16 and conductor 36 leads to a localized deformation in layer 32 and the portion of conductor 150 which overlaps the respective electrode 16. Localized deformations are utilized to phase modulate a wavefront incident on modulator 10.

Since conductor 150 is transmissive to the wavelengths of the wavefront to be modulated, the wavefront traverses layer 32 and impinges on electrodes 16. After reflection from electrodes 16, the direction of propagation is reversed, resulting in a second traverse of layer 32. The wavefront then exits modulator 10. The potential control means allows the electric field between conductor 150 and each electrode 16 to be varied in accordance with an information bearing signal, imparting the desired phase modulation to the wavefront traversing the modulator.

In an unexcited state the optical path length is proportional to 2nd, where n is the index of refraction of layer 32, and d is thickness 36 in the undeformed state. This represent a significant advantage of my invention over prior art, since prior electronic addressed surface deformation type spatial light modulator art have utilized a reflective first surface conductor and/or utilized gaps with the media.

Substrate materials include glass, ceramics, and Sapphire. Such materials are well understood by those knowledgeable in the state of the art. Information is provided in the references cited herein.

Affixing optically reflective electrodes to the substrate of my invention provides several advantages over prior art. Such electrodes affixed to the substrate are made "thicker" than optically reflective electrodes affixed to the first surface of the deformable media. This enhances the reflectivity of the electrodes which enhances luminous efficiency without adversely effecting the deformation efficiency of the deformable media.

As identified in the references cited herein, surface forces on the deformable media influences the deformation efficiency. Utilizing a transmissive conductor allows more latitude in establishing and controlling surface forces on the deformable layer. This is attributed to not having to establish a suitable reflectance value in conjunction with optimizing surface forces when identifying a first surface conductor. Eliminating reflectivity considerations allows more latitude in establishing a conductor thickness and/or material selection. This enhances the modulation efficiency of my invention as compared to prior art.

Figure 2:
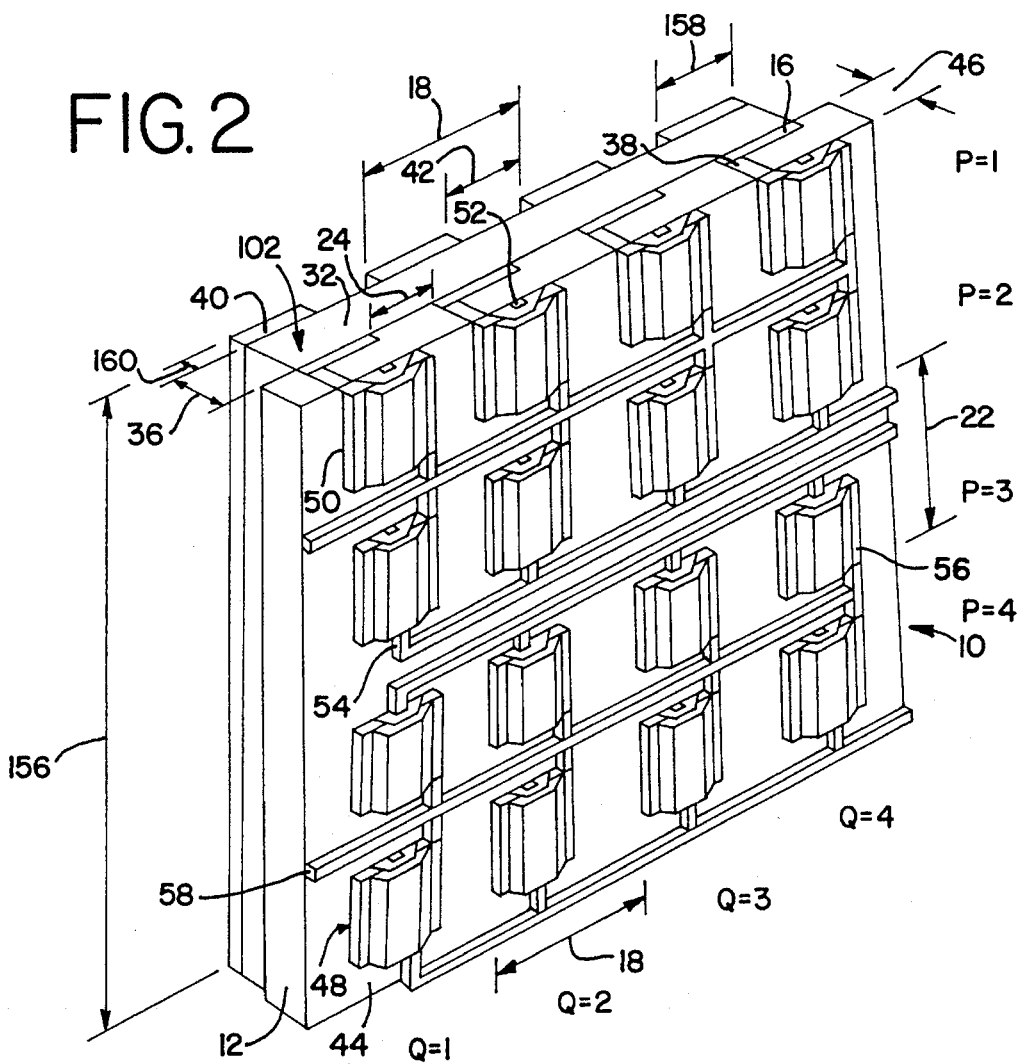
FIG. 2 shows electronic addressing elements affixed to the second surface of the substrate in my invention.

FIG. 2 shows an alternative embodiment of my invention. A modulator 10 contains an insulating substrate 12. Affixed to substrate 12 by a means is a plurality of optically reflective electrodes 16 arranged in a matrix of p rows and q columns. Affixed to substrate 12 by a means is a transmissive deformable media layer 32. Layer 32 contains a first media layer face. The first media layer face is not visible in the figure. Modulator 10 further includes a plurality of transmissive column conductors 40. Each column conductor 40 spans second modulator dimension 156. Adjacent column conductors 40 are displaced by period 18. Each column conductor 40 overlaps a respective column q of electrodes 16. Each column conductor 40 is affixed to substrate 12 by a conductor affixing means. Conductor affixing means includes affixing each column conductor 40 to the first media layer face. Adjacent conductors 40 are separated by an insulating width gap 42. Gap 42 is in registration with width 24. Each column conductor 40 has a column width 158. When layer 32 is in an undeformed state, each column conductor 40 has a column thickness 160. Thickness 160 is parallel to thickness 36.

Substrate 12 further includes a second major surface 44. Second surface 44 is essentially parallel to the first major surface. The first major surface and second surface 44 are separated by a substrate thickness 46. Substrate thickness 46 is perpendicular to period 18 and period 22. Affixed to second surface 44 by a means is a plurality of electronic addressing elements 48 arranged into an active matrix of p rows and q columns. Adjacent elements 48 in each row p are displaced by period 18. Adjacent elements 48 in each column q are displaced by period 22. Each electrode 16 overlaps a respective element 48. Each electrode 16 is electrically connected to a first switch terminal 50 of the respective element 48 by a feedthrough 38. Every element 48 further includes a second switch terminal 52. Every second switch terminal 52 in each row p is electrically connected by a respective first matrix buss 54. The buss 54 for row p=1 is not shown in the figure for clarity. Every buss 54 is essentially parallel to period 18. Every buss 54 is affixed to surface 44 by a means. Means include vacuum deposition of a metal to surface 44. Buss metals are well understood by those knowledgeable in the state of the art. Each element 48 further includes a third switch terminal 56. Every third switch terminal 56 in each row p is electrically connected to a common potential source by a second matrix buss 58. The common potential source is not shown in the figure. Every buss 58 is parallel to every buss 54. Having every buss 58 parallel to every buss 54 avoids electrical crossover networks in the active matrix. Every buss 58 is affixed by a means to surface 44. Avoiding electrical cross over networks enhances reliability of my invention when compared to prior art.

Several addressing elements are utilizable with my invention. Elements in FIG. 2 are drawn to depict thin film transistors. As well understood by those knowledgeable in the state of the art, vacuum deposition of thin film components represents a means to affix such elements to the second major surface of the substrate. Alternative elements are identified in the references provided herein.

Affixing addressing elements to the second major surface of the substrate allows considerable flexibility in processing and selecting components for use in surface deformation type spatial light modulators. References include patent application Ser. No. 07/953,118, titled "Enhanced Surface Deformation Light Modulator" file date Sep. 26, 1992, application Ser. No. 07/955,058, titled "Enhanced Electrostatic Shutter Mosaic Modulator" file date Oct. 1, 1992, and application Ser. No. 07/958,642 titled Enhanced Membrane Light Modulator" file date Oct. 7, 1992 all submitted by Craig D. Engle.

As fully described in the references cited herein, a potential control means is provided to apply between each column conductor and every electrode overlapped by the column conductor a respective potential difference in accordance with an information bearing signal. Techniques for controlling the respective potential difference between each electrode 16 and the column conductor overlapping the electrode are provided in the cited references. Due to the diversity of options available for electrically connecting the second and third switch terminals of the electronic addressing elements in an active matrix array, the potential control means is expanded in definition to include the orientation of the first matrix busses and the second matrix busses. This allows the second and third switch terminals to be connected in a configuration most appropriate for the embodiment under consideration. For instance, when utilizing a monolithic conductor, the embodiment described in U.S. Pat. No. 3,654,606 to Marlowe et al, Apr. 4, 1972, FIG. 3 is very desirable. The potential control means includes circuitry necessary for controlling the impedance state of each element 48 to allow the respective potential difference to be established between each electrode and the conductor overlapping the electrode in accordance with an information bearing signal. Such techniques are well understood by those knowledgeable in the state of the art.

Each electrode 16 and the column conductor 40 overlapping the electrode 16 form components of a pixel capacitor site 102. Analogous definition exists for monolithic conductor embodiments.

Utilization of an insulating substrate allows considerable flexibility in establishing suitable boundary constraint means for use in influencing the deformable media to enhance array performance. Ridges are easily fabricated in the substrate of my invention. Ridges physically isolate the deformable media into adjacent rows and/or columns allowing a discrete pixel element device to be fabricated. Therefore ridges, acting as an interface between adjacent media sites, function as a boundary constraint means.

FIG. 3 shows a modulator 10. Modulator 10 contains a substrate 12. Substrate 12 contains a plurality of ridges 60. Adjacent ridges 60 are displaced by second period 22. Each ridge 60 is affixed to first surface 14 by a means. Ridges 60 are etched in substrate 12 to produce the corrugated surface; etching ridges in a substrate is a means to affix ridges to the substrate. Substrate 12 contains a plurality of electrodes 16 arranged in a matrix of p rows and q columns.

Each ridge 60 has a ridge crown surface 62. Ridge crown surface 62 is separated from first surface 14 by media thickness 36 when layer 32 is undeformed. Crown surface 62 is essentially parallel to surface 14. Conductor 150 is affixed to first media layer face 34 by a conductor affixing means. Portions of media layer 32 and conductor 150 have been removed to reveal features of my invention. Conductor affixing means further includes affixing conductor 150 to every ridge crown surface 62 by a means. Techniques are well understood by those knowledgeable in the state of the art. Affixing conductor 150 to every ridge crown surface 62 establishes boundary conditions which influence the deformation profile of the portion of layer 32 and conductor 150 overlapping a respective electrode 16. Affixing conductor 150 to ridge crown surface 62 influences the surface forces present on face 34 which, as identified in the references cited herein, influence the deformation profile For convenience, in the figure, media face 34 is shown as planar in the undeformed state.

Each ridge 60 contains a first flank face 64 and a second flank face. Every first flank face 64 is essentially planar, every second flank face is essentially planar and essentially parallel to every first flank face 64. The second flank faces are not visible in the figure. Each first flank face 64 has a surface normal 66. Normal 66 is parallel to period 22. First flank face 64 is separated from the second flank face by insulating length 26. Ridges 60 are disposed between adjacent rows of electrodes 16. Embedded in each respective ridge 60 is a first bias buss 68. Each first bias buss 68 contains an exposure face 70. Each exposure face 70 is coplanar with first flank face 64 of the respective ridge 60. Each exposure face 70 has a face height 72. Height 72 is parallel to thickness 36. Each exposure face 70 has a lateral face dimension 74. Dimension 74 spans modulator dimension 154. Each exposure face 70 is offset from major surface 14 by a first offset distance 76. First offset distance 76 is parallel to thickness 36. Each exposure face 70 is offset from a respective ridge crown surface 62 by a second offset distance 78. Second offset distance 78 is parallel to thickness 36. Embedding each bias buss 68 in a respective ridge 60 represents a means to affix a bias buss to a ridge. Alternative means include vacuum deposition of the buss to the flank face. Each bias buss 68 has a buss thickness 80. Thickness 80 is parallel to normal 66. Embedding a bias buss 68 in a respective ridge 60 requires thickness 80 to be recessed in the respective ridge 60.

Modulator 10 contains a plurality of second bias busses 82. Each second bias buss 82 is embedded in a respective ridge 60. Each second bias buss 82 contains an exposure face. The exposure face of each second bias buss is coplanar with the second flank face of a respective ridge. The exposure faces of second bias busses 82 are not visible in the figure.

The geometry and positioning of each second bias buss is similar to the description provided for bias busses 68.

As well understood by those knowledgeable in the state of the art, bias busses and the second bias busses influence the deformation profile of the portion of media layer 32 and conductor 150 overlapping an electrode 16 by the utilization of "fringing field". A first bias potential is applied to the conductor. A second bias potential is applied to every bias buss and every second bias buss. The first bias potential source and the second bias potential source are not shown in the figure. The potential difference between the conductor and each bias buss and each second bias buss leads to electrostatic forces between the conductor and bias busses and second bias busses which influences the deformation profile. (Deformation profile is identified as a thickness function of position, position being specified by components parallel to the first and second periods) Techniques for applying potentials to the bias busses and the conductor are well understood by those knowledgeable in the state of the art and are not shown in the figure.

Bias busses and second bias busses and the potential applied to these respective busses form a electric field bias means. Although in FIG. 3, each second bias buss has been shown as separate from the bias buss embedded in the same ridge, alternative means exist for fabricating bias busses. FIG. 4 shows a ridge 60. Affixed to the ridge crown surface is a conductive strip 84. The ridge crown surface is not visible in the figure. Conductive strip 84 has a strip height 86. Affixed to strip 84 is an insulating spacer 88. Spacer 88 has a spacer crown surface 90. Conductors are not shown in the figure. Strip 84 has a lateral dimension 74'. Strip 84 has a first exposure face 70' and a second exposure face. First exposure face 70' is coplanar with first flank face 64. Second exposure face of strip 82 is coplanar with the second flank face of ridge 60. The second exposure face and the second flank face are not shown in the figure. Strip 84 has a strip length 26'. Insulators are any convenient insulating material deposited over the conductive strip. Such material include silicon dioxide. Depositing an insulating layer on the conductive strip represents a means to affix the insulating layer to the substrate.

As previously identified, ridges are a boundary constraint means.

Additional techniques exist to implement boundary constraint means in the wavefront modulator of my invention. FIG. 5 shows a substrate containing a plurality of ridges 60 and dividers 92. Dividers 92 are utilized to establish additional boundary constraints in the deformable media. Dividers 92 are a boundary constraint means. The media is not shown in the figure. Adjacent dividers 92 in each row p are displaced by first period 18. Every divider 92 in each row p overlaps a respective insulating width 24. Each divider 92 has a divider width 94. Divider width 94 is parallel to and equal to width 24. Each divider 92 has a divider height 96. Divider height 96 is perpendicular to period 18 and period 22. Each divider 92 has a divider length 98. Divider length 98 is equal to period 22 minus insulating length 26. Length 98 is parallel to period 22. Each divider 92 has a divider crown surface 100. Crown surface 100 is coplanar with ridge crown surface 62. Conductors are affixed to divider crown surface 100 by any means. Conductors are not shown in the figure. Dividers 92 are affixed to surface 14 by a means. Procedures include procedures identified in the article "A Membrane Page Composer" by L. S. Cosentino and W. C. Stewart, RCA review, Vol. 34, March, 1973.

Ridges and dividers disperse the media layer into a plurality of discrete media layers constrained within a respective pixel capacitor site 102.

Additional boundary constraint means exist to disperse a deformable layer into discrete layer sites. FIG. 6 shows an modulator 10 containing a plurality of discrete media sites 102. Array 10 contains a substrate 12. Substrate 12 contains a first surface 14. Substrate 12 contains a plurality of wells 104 arranged into a matrix of p rows and q columns. Adjacent wells 104 in each row p are displaced by period 18. Adjacent wells 104 in each column q are displaced by period 22. Every well 104 has an essentially circular cross section of a diameter 106. Each well 104 is sunk in substrate 12 a well depth 108 below surface 14. A portion of substrate 12 has been shown cut away to reveal features of my invention. Affixed to a bottom surface 110 of each respective well 104 is an optically reflective electrode 16. Affixing electrodes 16 to the bottom surface 110 of a respective well 104 represents a means to affix electrodes 16 to substrate 12. Wells 104 require the deformable media layer to be dispersed into a plurality of discrete media layers, each discrete media layer filling the available volume in a respective well 104. Well 104 constrains the respective media layer. The discrete media layers are not shown in the figure. Filling the available volume of each well 104 (electrode has a thickness with a respective deformable media "pixel" layer represents a means to affix each media layer to the substrate.

Affixed to substrate 12 by a conductor affixing means is a plurality of column conductors 40. Each column conductor 40 overlaps a respective column q of electrodes 16. Conductor affixing means includes affixing each conductor 40 to the first media layer face of every layer in a respective column. Conductor affixing means further includes affixing every conductor 40 to first surface 14 by a means. The first media layer faces are not shown in the figure. Each electrode 16 is electrically connected to a respective electronic addressing element by a respective feedthrough 38. Addressing elements are not shown in the figure. A potential control means is provided to control the respective potential difference between each conductor and every respective electrode overlapped by the conductor 40 in accordance with an information bearing signal. The above configuration is referred to a "The Poppet Valve Modulator", and is the preferred embodiment of my invention. The preferred electronic addressing element active matrix array configuration for my invention will be identified herein.

As well understood by those knowledgeable in the state of the art, a monolithic conductor is utilizable in the above configuration. Utilizing the information provided herein, active matrix arrays containing a plurality of electronic addressing elements are capable of being configured for either type of conductor.

FIG. 7 shows an exploded view of an array 10 containing wells 104. Substrate 12 contains a first surface 14. Affixed to surface 14 by a means is an conductive grille 112. Grille 112 contains a first grille surface 114 and a second grille surface. The second grille surface is not visible in the figure. First grille surface 114 and the second grille surface are essentially parallel planes. First grille surface 114 is separated from the second grille surface by a grille thickness 116. Grille 112 contains a plurality of holes 118 arranged into a matrix of p rows and q columns. Adjacent holes 118 in each row p of grille 112 are displaced by first period 18. Adjacent holes 118 in each column q of grille 112 are displaced by second period 22. The second grille surface is affixed to surface 14 by a means. Means further includes superimposing holes 118 over respective wells 104. Holes 118 have a hole diameter 106' equal to the well diameter 106. Masks and deposition sequences are well understood by those knowledgeable in the state of the art. Such deposition techniques represent a means to affix the grille to the substrate.

Affixed to first grille surface 114 by a means is an insulating spacer plate 120. Spacer plate 120 contains a plurality of holes 118 arranged into a matrix of p rows and q columns. Adjacent holes 118 in each row p of plate 120 are displaced by first period 18. Adjacent holes 118 in each column q of plate 120 are displaced by second period 22. Plate 120 contains a first major plate surface 122 and a second major plate surface. The second major surface of plate 120 is not visible in the figure. First major surface 122 and the second major surface are essentially parallel planes. First major surface 122 and the second major surface are separated by a plate thickness 124. The second surface of plate 120 is affixed to first surface 14 of grille 112 by a means. Means further includes positioning plate 120 so that holes 118 in plate 120 superimpose over holes 118 in grille 112. Materials for plate 120 include silicon dioxide. Alternative techniques for establishing a plate 120 are well understood by those knowledgeable in the state of the art, and includes bonding a insulating plate with holes to the grille. Affixing plate 120 to grille 112 represents a means to affix plate 120 to substrate 12.

A monolithic conductor 150 is affixed to substrate 12 by a conductor affixing means. Conductor affixing means includes affixing conductor 150 to first surface 122 of plate 120. Each discrete media layer constrained in a respective well 104 is increased in thickness to allow the first face of each constrained media layer to intersect surface 122 when in an undeformed state. This facilitates affixing conductor 150 to substrate 12.

As identified in the references provided herein, several active matrix array configurations are utilizable with my invention. As well understood by those knowledgeable in the state of the art, matrix configurations are selectable on whether a monolithic conductor or column conductors are utilized in the embodiments. When utilizing column conductors, additional consideration include elimination of electrical crossover networks.

Figure 8:
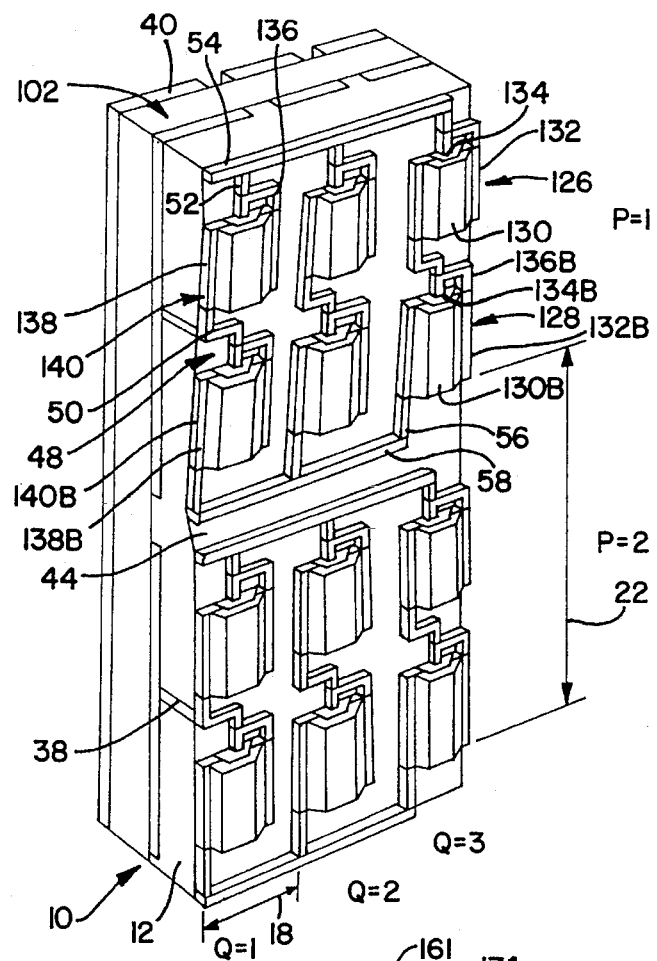
FIG. 8 shows an electronic addressing element active matrix array affixed to the second surface of the substrate.

FIG. 8 shows a modulator 10 containing a substrate 12. Affixed to the second major surface 44 of substrate 12 is a plurality of electrical addressing elements 48 arranged into a matrix of p rows and q columns. Adjacent elements 48 in each row p are displaced by first period 18. Adjacent elements in each row p are displaced by a second period 22. Every element 48 further includes a first diode 126 and a respective second diode 128. Every first diode 126 is formed from a thin film transistor 130 by electrically connecting a drain electrode 132 to a gate electrode 134 by an anode interconnect 136. A source electrode 138 forms a first diode cathode 140.

Every respective second diode 128 is formed from a thin film transistor 130B by electrically connecting a drain electrode 132B to a gate electrode 134B by an anode interconnect 136B. A source electrode 138B is a second diode cathode 140B. Each anode interconnect 136 of every first diode 126 in each row p is electrically connected to a respective first matrix buss 54 by a respective second switch terminal 52. Every buss 54 is parallel to period 18. Each cathode 140B of every respective second diode 128 in each row p is electrically connected to a respective second matrix buss 58 by a respective third switch terminal 56. Each buss 58 is parallel to every buss 54. Each cathode 140 of every first diode 126 in each row p is electrically connected to anode interconnect 136B of the respective second diode 128 by a respective first switch terminal 50. Each electrode 16 is electrically connected to a respective first switch terminal 50 by a feedthrough 38. A plurality of column conductors 40 is affixed to substrate 12 by a conductor affixing means. Each column conductor 40 overlaps a respective column q of electrodes 16.

Each electrode 16, the column conductor overlapping it, and the media overlapping the electrode form a pixel capacitor site 102. Each electrode 16 is a first capacitor electrode and the column conductor 40 overlapping the respective electrode 16 forms a second electrode of site 102.

The active matrix configuration described above is similar to U.S. Pat. No. 3,654,606 to Marlowe et al, Apr. 4, 1972. As identified in the cited references, "switches" are provided to control the voltages distributed to each column conductor, each first matrix buss and each second matrix buss. Switches are not shown in the figure but their form and function are described in the references.

Electronic addressing elements in conjunction with "switches" allows the potential difference of each capacitor site to be controlled in accordance with an information bearing signal. The information bearing signal and the "switches" are not shown in the figure. Due to the diversity of options available for interconnecting the second and third switch terminals of the electronic addressing element sin an active matrix array, every first matrix buss and every second matrix buss is included in the definition of a potential control means. The active matrix configuration illustrated in FIG. 8 is the preferred active matrix configuration of my invention.

Alternative active matrix interconnects are defined in the references cited herein and include FIG. 3 of U.S. Pat. No. 3,654,606.

Figure 9:
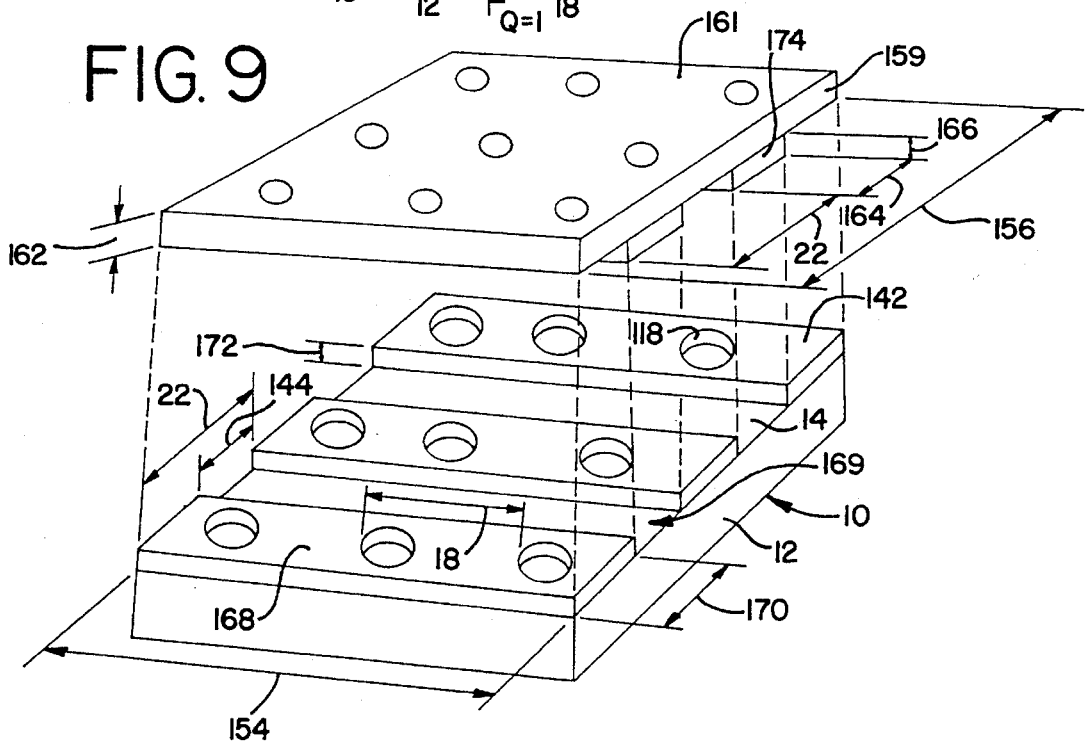
FIG. 9 shows how bias electrodes are implemented in my invention.

Additional alternative bias electrode configurations exist. FIG. 9 shows a modulator 10 containing a substrate 12. Affixed to a first surface 14 is a plurality of grille segments 142. Adjacent grille segments 142 are displaced by period 22. Adjacent grille segments 142 are separated by a furrow width 144. Each grille segment 142 contains a grille width 170. Width 170 is parallel to period 22. Width 170 is equal to period 22 minus furrow width 144. Each grille segment further includes a first grille segment face 168 and a second grille segment face. The second grille segment face is not visible in the figure. Each segment 142 has a grille thickness 172. Thickness 172 separates face 168 and the second grille segment face. Face 168 is essentially parallel to surface 14. Each grille segment 142 contains a plurality of holes 118. Adjacent holes 118 in each segment 142 are displaced by first period 18. Thickness 172 is perpendicular to period 18 and period 22. Each hole 118 overlaps a respective well in substrate 12. Wells are not visible in the figure. Utilizing grille segments 142 allows greater freedom in applying bias voltages in my invention.

Each Grille segment 142 spans modulator dimension 154.

Modulator 10 further includes an insulating plate 159. Plate 159 spans a first modulator dimension 154 and a second modulator dimension 156. Plate 159 contains a first plate surface 161 and a second plate surface. The second plate surface is separated from first plate surface 161 by a plate thickness 162. Thickness 162 is parallel to thickness 172. Affixed to plate 159 by a means is a plurality of dielectric spacers 174. Each spacer 174 has a spacer width 164. Each spacer 174 has a spacer depth 166. Adjacent spacers 174 are displaced by second period 22. Depth 166 is parallel to thickness 162. Each spacer 174 is affixed to surface 14 by a means. The dimensions of depth 166 and width 164 are such that each spacer 174 fills a respective furrow 169 between adjacent segments 142. Furrow dimensions include thickness 174, width 144 and dimension 154.

A conductor or a plurality of column conductors are affixed to substrate 12 by a conductor affixing means. Conductor affixing means further includes affixing the conductor or column conductors to the first surface 161 by a means. Such means are well understood by those knowledgeable in the state of the art. A monolithic conductor or column conductors, electronic addressing elements etc. are not shown in the figure for convenience. Techniques for applying a separate bias potential to each respective segment are well understood and not shown in the figure. Grille segments are a electric field bias means.

Vacuum deposition of metal segments is a means to affix grille segments to a substrate.

Techniques for fabricating insulating plates include thermally grown layers such as silicon dioxide. Thermal growth of insulating materials represents a means to affix an insulating plate to a substrate. Alternative means include bonding an insulating plate to the first grille surface.

It is not essential to include spacers in the configuration of FIG. 9. Spacers influence the electric fields in my invention and are identified to allow additional degrees of freedom in my invention.

Techniques to affix spacers to a substrate are understood by those knowledgeable in the state of the art. Fabrication sequences for the configuration options of spacers, no spacers, etc. are well understood by those knowledgeable in the state of the art.

SUMMARY RAMIFICATIONS AND CONCLUSIONS

While my above description contains many specificities, these should not be construed as limitations on the scope of the invention, but rather as an exemplification of one preferred embodiment therefore. Many other variations are possible.

Although insulating substrates are the preferred substrate material of my invention, it is quite apparent that electronic addressed surface deformation type modulators utilizing semiconductor substrates are improvable by utilizing a transmissive first surface conductor. Several desirable features of my invention are incorporable into modulators utilizing semiconductor substrates. Therefore, substrate material options for use in my invention are expanded to include semiconductor substrates so that certain attributes of my invention enhance modulators utilizing semiconductor substrates. Diffusion of impurities into a substrate to form electronic elements is a means to affix elements to a substrate.

As identified herein, several electronic addressing elements exist. Elements are capable of being fabricated from laser recrystallized silicon islands affixed to the second surface of an insulating substrate. Fabrication of such elements accentuate the flexibility inherent in "dual face processing" available in my invention.

In addition, it should be noted that electronic addressing elements include two terminal devices, such as varistors. Such addressing elements and the configurations necessary to operate my invention with these devices are well understood by those knowledgeable in the state of the art. Electrically connecting feedthroughs to row varistor elements forms a first switch terminal. The second switching terminal would be the matrix buss affixed to the varistor element. References further include U.S. Pat. No. 4,233,603 to Castleberry Nov. 11, 1980, and the article "The Future of Thin-Film Active Devices" by Charles Feldman, Electronics, Jan. 24, 1964.

Ridges in a substrate are orientable to be parallel to either dimension of the modulator. This allows bias electrodes affixed to ridges, and the associated fringing fields, to generate different force components on column conductors or conductors utilized in the modulator. Additional degrees of freedom include which crown surfaces the conductor and/or conductors are affixed to. These options increase the latitude of establishing appropriate boundary constrains and surface forces in my invention.

As well understood by those knowledge in the state of the art, AC operation of my invention is possible.

Diagonal arrangements of electrodes are permissible. Such techniques include electrode arrangements identified in the references provided herein.

Linear arrays of deformable surface type spatial light modulators employing various attributes of my invention are utilizable in a variety of applications including hard copy printing devices, such as "laser printers".

Anisotropic material are utilizable as a deformable media in my invention. Such material selection is utilizable in conjunction with various boundary constraint means to allow additional degrees of freedom to influence the deformation of the media utilized in my invention.

The preferred media for use in my invention is silicone rubber, similar to what is identified in U.S. Pat. No. 3,626,084.

Accordingly, the scope of the invention should not be determined by the embodiments illustrated, but by the appended claims and their legal equivalents.

I claim:

1. An enhanced surface deformation type spatial light modulator comprising:

a substrate, a plurality of optically reflective electrodes affixed to said substrate, each said electrode being overlapped by transmissive deformable media means, said media means comprising a transmissive substance possessing rubbery attributes, said media means having a first surface in contact with said electrodes and a second surface opposite thereof, each said electrode having transmissive deformable conductor means operatively associated therewith, means to affix said conductor means to said second surface of said media means, potential control means to apply an electric field between each said electrode and the conductor means operatively associated with each said electrode to establish an electrostatic force between said conductor means and said electrodes, means operatively associated with said potential control means varying said electric fields to vary said electrostatic forces between said conductor means and the corresponding one(s) of said electrodes which varies the deformation of said conductor means thereby phase modulating a wavefront which is incident on said conductor means, at least a portion of said wavefront traversing said media means impinging on and reflected by said electrodes to again traverse said media means and issue from said modulator thereby precluding said impinging and reflected portion of said wavefront from traversing said substrate.

2. The device of claim 1 wherein each said electrode is electrically connected to a first terminal of a respective electronic switching element, each said element is affixed to said substrate.

3. The device of claim 2 wherein each said element is a three terminal element.

4. The device of claim 3 wherein each said three terminal element is a field effect transistor.

5. The device of claim 4 wherein each said transistor is a thin film transistor.

6. The device of claim 5 wherein said transmissive substance possessing rubbery attributes is a silicone rubber, each said thin film transistor is affixed to a surface of said substrate opposite said media means.

7. The device of claim 2 wherein said transmissive substance possessing rubbery attributes is a silicone rubber.

8. An enhanced surface deformation type spatial light modulator comprising:

a substrate, a plurality of optically reflective electrodes affixed to said substrate, each said electrode being overlapped by transmissive deformable media means, said media means comprising a transmissive substance possessing a rubbery component, said media means having a first surface in contact with said electrodes and a second surface opposite thereof, each said electrode having transmissive deformable conductor means operatively associated therewith, means to affix said conductor means to said second surface of said media means, potential control means to apply between each said electrode and said conductor means operatively associated therewith a respective potential difference in accordance with an information bearing signal, said potential difference causing said conductor means to deform with said deformation being a function of said information bearing signal enabling a portion of a wavefront which is incident on said conductor means traverses said media means impinges on said electrodes is reflected from said electrodes again traverses said media means and issued from said modulator to be phase modulated in accordance with said information bearing signal thereby precluding said portion of said wavefront impinging on said electrodes from traversing said substrate.

9. The device of claim 8 wherein said transmissive substance possessing said rubbery component is a silicone rubber.

10. The device of claim 9 wherein said potential control means further includes each said electrode being electrically connected to a respective electronic switching element, means for affixing each said element to said substrate.

11. The device of claim 10 wherein each said element is a thin film transistor, each said thin film transistor is affixed to a surface of said substrate opposite said media means., 12. An enhanced surface deformation type spatial light modulator comprising:

a substrate, a plurality of optically reflective electrodes affixed to said substrate, each said electrode being overlapped by transmissive deformable media means, said media means comprising a transmissive substance possessing a rubbery component, said media means having a first surface in contact with said electrodes and a second surface opposite thereof, each said electrode having transmissive deformable conductor means operatively associated therewith, means to affix said conductor means to said second surface of said media means, potential control means to apply an electric field between each said electrode and the conductor means operatively associated with each said electrode to establish an electrostatic force between said conductor means and said electrodes, means operatively associated with said potential control means for varying said electric fields to vary said electrostatic forces between said conductor means and the corresponding one(s) of said electrodes to vary a surface force on said media means thereby deforming said conductor means and said media means to phase modulate a wavefront which is incident on said conductor means and traverses said media means, at least a portion of said wavefront impinging on said electrodes being reflected by said electrodes again traversing said media means and issuing from said modulator to thereby preclude said portion of said wavefront impinging on said electrodes from traversing said substrate.

13. The device of claim 12 wherein said transmissive substance possessing said rubbery component is a silicone rubber.

14. The device of claim 12 wherein each said electrode is electrically connected to a respective electronic switching element, means for affixing each said element to said substrate.

15. The device of claim 14 wherein each said element is a thin film transistor, each said thin film transistor further includes a drain electrode, a gate electrode and a source electrode, means for affixing each said thin film transistor to said substrate further includes each said thin film transistor being affixed to a surface of said substrate opposite said media means.

16. The device of claim 15 wherein said electrodes are arranged into a periodic two dimensional spatial distribution.

17. The device of claim 16 wherein said distribution further includes p rows and q columns of said electrodes, said conductor means comprises a transmissive deformable monolithic conductor overlapping each said electrode.

18. The device of claim 16 wherein said distribution further includes p rows and q columns of said electrodes, said conductor means further includes a plurality of transmissive deformable column conductors, each said column conductor overlaps a respective column q of electrodes, said potential control means further includes the gate electrodes of said thin film transistors which are electrically connected to said electrodes in each row p are electrically connected by a respective row select buss, each said row select buss is affixed to said surface of said substrate opposite said media means, a plurality of common busses electrically connecting the source electrodes of said thin film transistors to a common potential source, each said common buss is affixed to said surface of said substrate opposite said media means, each said common buss is essentially parallel to every said respective row select buss thereby avoiding electrical crossover networks.

19. The device of claim 18 wherein said transmissive substance possessing said rubbery component is a silicone rubber.

* * * * *